Sept. 30, 1941.  T. ALTON  2,257,147
METHOD AND APPARATUS FOR CANNING FRUITS FOR SALADS
Filed Aug. 21, 1939  3 Sheets-Sheet 2
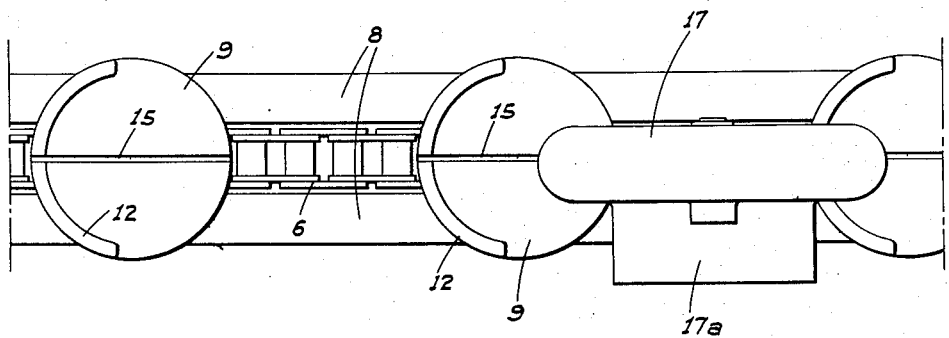
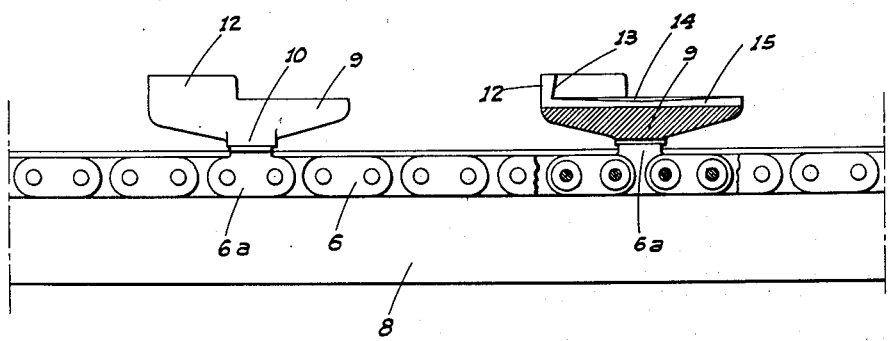
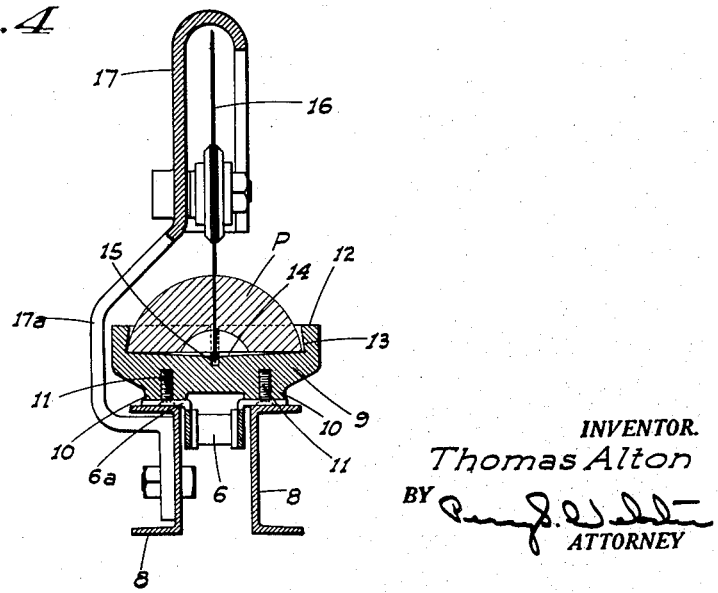
INVENTOR.
Thomas Alton
BY
ATTORNEY Sept. 30, 1941. T. ALTON 2,257,147
METHOD AND APPARATUS FOR CANNING FRUITS FOR SALADS
Filed Aug. 21, 1939 3 Sheets-Sheet 3
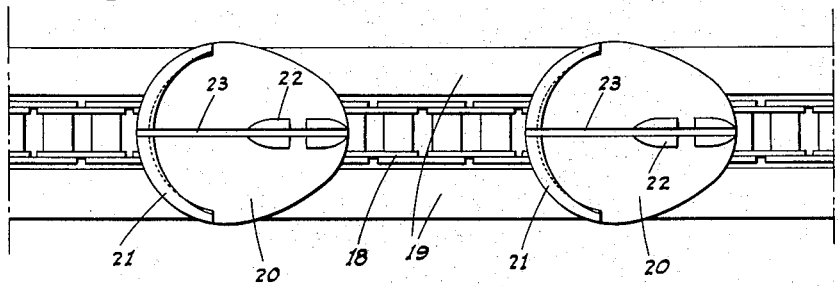
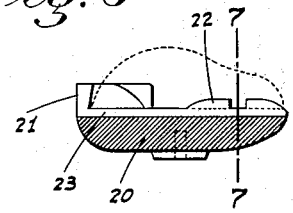 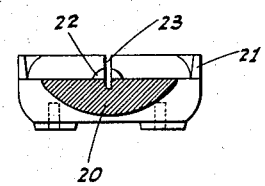
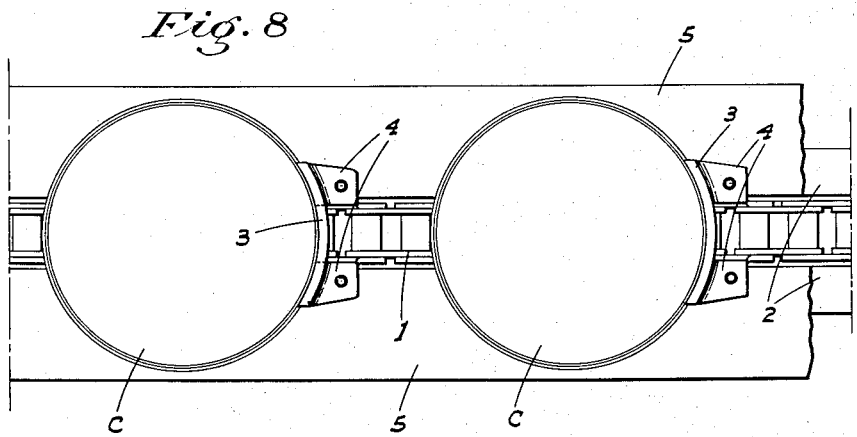
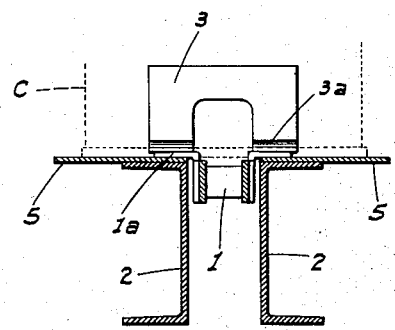
INVENTOR.
Thomas Alton
BY
ATTORNEY Patented Sept. 30, 1941

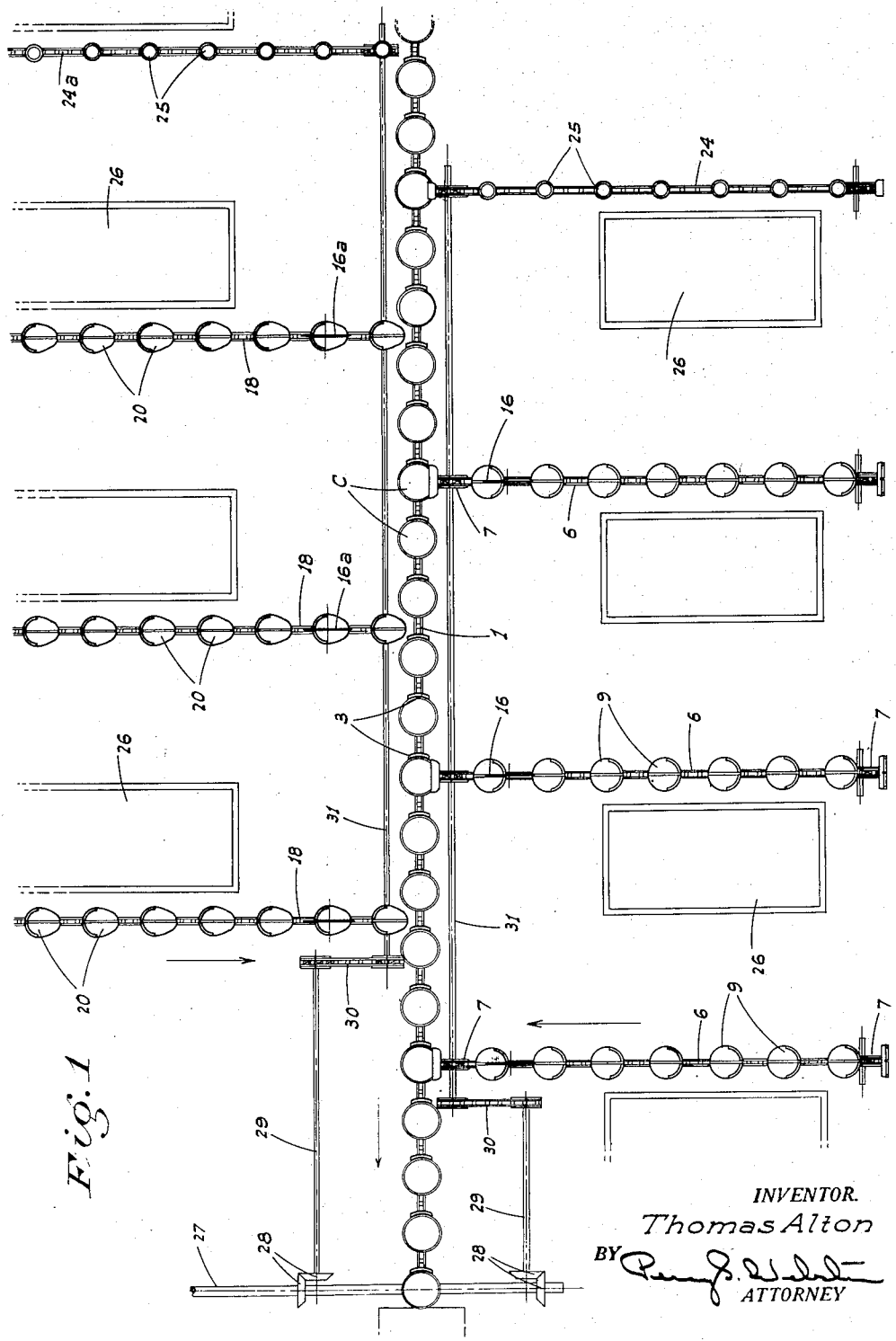

2,257,147

UNITED STATES PATENT OFFICE 2,257,147

METHOD AND APPARATUS FOR CANNING FRUITS FOR SALADS

Thomas Alton, San Jose, Calif., assignor to E. E. Chase, Jr., San Jose, Calif., doing business as Chevy Chase Co.

Application August 21, 1939, Serial No. 291,167

3 Claims. (Cl. 226—69)

This invention relates to improvements in the canning art, and particularly to a method and apparatus for the cutting and proportioning of different kinds of fruits for salad and continuously filling different fruits into cans in the proper proportions without interrupting the flow of fruit or the continuous movement of the cans to the cookers.

In more detail, the invention relates particularly to a means for continuously cutting and moving peach sections into cans and likewise continuously cutting and moving pear sections into the cans so that as the cans are filled, they will contain the desired proportion of peaches and pears.

The invention further contemplates the introduction into the can of other fruits such as processed cherries, pineapple, or other ingredients considered desirable for intermixing in a fruit salad made up primarily of peaches and pears.

Heretofore it has been the common practice to cut the peaches and pears into sections by hand and to place them into the cans by hand. This involves a great deal of hand labor and is slow and expensive, and renders the cost of canning the fruits for salad greater than it should be. The present invention contemplates the automatic and continuous discharge of the same into the cans in proper proportions.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a top plan view showing in a diagrammatic manner the layout of the apparatus used for the accomplishment of the objects of the invention.

Figure 2 is a top plan view of a fragmentary portion of the peach carrier line.

Figure 3 is a side elevation of a fragmentary portion of the peach cutting line, showing one of the peach carriers in section.

Figure 4 is a vertical cross-section through the peach carrier line showing one of the peach carriers in section and indicating the position of a peach half thereon as it is being operated on by the cutting knife.

Figure 5 is a top plan view of a fragmentary portion of the pear carrier line.

Figure 6 is a longitudinal section through one of the pear carriers.

Figure 7 is a cross sectional view of the same pear carrier, taken approximately on the line 7—7 of Fig. 6.

Figure 8 is a top plan view of a fragmentary section of the can carrier line.

Figure 9 is a cross-sectional view through the can carrier line.

Referring now more particularly to the characters of reference on the drawings, I shall state first that the apparatus used for carrying out my improved method consists generally of a longitudinally operating can carrying line. Disposed at right angles to this can carrying line are the peach and pear carrying lines, the peach carrying lines being on one side of the can carrying line and the pear carrying line being on the opposite side thereof. The peach carrying lines are spaced from the pear carrying lines so that a peach carrying line and a pear carrying line will preferably discharge alternately into cans carried on the can carrying line.

The can carrying line consists generally of an endless link chain 1 or other conveyor element movable between guide elements 2 of any desired construction, but shown in the drawings as being spaced channel irons. On the top flanges 1a of the elements 2 may be provided wearing strips 5 of brass or other desired material and of any desired width. On the chain 1 at equally spaced intervals are secured, preferably as an integral part of certain links of the chain, brackets 4 which ride the wearing plates 5 as the chain is drawn along between the guide elements 2.

Secured to each bracket 4 is a can carrier 3. This carrier is in the form of an arcuate flange which is rabbeted out slightly at its lower edge as at 3a in order to accommodate the small flange on a can end.

In practice, the cans C are placed ahead of these carriers and are carried along thereby to ride the wearing plates 5 as the chain 1 is moved along this can carrying line. This action progressively moves the cans continuously and at a predetermined speed past certain points at which they are filled with the fruits for salad, as will be now described in more detail.

As shown in the diagrammatic outline in Fig. 1, the peach carrying lines are disposed at the right hand side of the can carrying line, while the pear carrying lines are disposed on the left hand side of the can carrying line and in alternate relation with respect to the peach carrying lines.

Each peach carrying line comprises an endless link chain 6 movable between spaced guide elements 8 similar to the guide plates 2 of the can line, and which may have wear strips on the top flanges thereof as do the members 2.

Spaced equally along the length of the chain 6 are brackets 6a formed preferably as part of the corresponding length of chain. To each spaced bracket is secured a peach carrier 9, more particularly shown in detail in Figs. 2 to 4 inclusive.

Each carrier 9 has a base boss 10 by which it is secured to the brackets 6a preferably through the medium of cap screws 11 or other fastening elements.

Each peach carrier 9 comprises generally a parallel supporting disc-like element approximately the circumference of the base of a half peach P. On the rear portion of each element 9 is a peach engaging flange 12 rabbeted out as at 13 to engage the edge of a peach disposed on the carrier and prevent its dislodgement therefrom or any shifting movement thereof. Each carrier 9 is also cupped in the center as at 14 to avoid any tendency to a vacuum suction being asserted against the concavity of the peach half which might prevent its ready discharge from the carrier.

A cutting groove 15 is provided diammetrically and longitudinally across the carrier 9 for the reception of the cutting knife as the carrier is drawn along by the chain 6, this feature being graphically illustrated in Fig. 4.

The cutting knife 16 is preferably circular in form and rigidly supported in a bracket 17 which overhangs the longitudinal center line of the carriers 9. In operation, the peach halves are delivered to tables or bins 26 and the operator of each line picks up the peach halves from the bin and places them progressively on the carriers 9. The travel of the chain 6 carries the carriers 9 and the peaches P mounted therein to the cutting knife 16, which is mounted just ahead of the chain sprocket 7 adjacent the can line. As the peach halves travel they are drawn against the knife 16, and as shown in the present drawings, are cut into quarters, although in practice more grooves may be provided in the carriers 9 and more knives used in order to cut peaches into smaller sections, if such should be found desirable.

After the peach halves have thus been cut into sections, the carriers 9 turn about the sprocket 7 adjacent the can line. The travel of the two chains 1 and 6 are so timed that just at the moment a carrier 9 turns over the sprocket 7, a can C will be positioned immediately below the same, and the sections of peach will discharge into the can. This operation is repeated, so that each time a can moves adjacent a peach carrier line, peach sections will be discharged into the same. I have shown three peach carrier lines in the drawing, although any number of such lines desired may be arbitrarily provided for.

The pear carrier lines are in general construction similar to the peach carrier lines, but are preferably alternately arranged with respect thereto as shown in Fig. 1, so that after the sections of one half peach have been discharged into the can, there will then be sections of a half pear discharged into the can, and this alternate delivery of peaches and pears will continue until the can is filled. The spacing of the cans of course is set, and the travel thereof timed, so that this alternate delivery of peaches and pears will be automatically provided for.

With reference now more particularly to Figs. 1, 5, 6 and 7 inclusive, each pear carrier line comprises the carrier chain 18 movable between the guide elements 19. The pear carrying elements 20 are secured to the chain 18 in a manner similar to that by which the peach carrier elements 9 are secured to their chain 6.

Each pear carrier 20 comprises a disc somewhat pear shaped in form, and having the back pear engaging flange 21 rabbeted out similarly to the flanges 12 in order to hold the pear halves from dislodgment from the carrier.

As additional aid to preventing the pear halves from shifting laterally on the carriers 20, I provide upstanding longitudinal ridges 22 against which the small ends of the pears may be pressed as they are mounted on the carriers. The carriers 20 have the cutting groove 23 similar to the cutting groove 15 of the peach carriers, and which provide for the action of the pear cutting knives 16a, which are identical in construction to the peach cutting knives 16, and are similarly mounted in like brackets.

The movement of the pear carriers are timed as are the peach carriers, so that as each carrier moves over its sprocket adjacent the can line, a can will be disposed immediately below the same to receive the discharge of the pear sections into the can. The operators take the pear halves from the adjacent bins 26 and place them on the carriers 20.

At any desired point along the can line, there may be disposed at right angles thereto other carrier chains 24 and 24a to which may be mounted small carrying cups 25 into which may be placed cherries, pineapple sections, or any other ingredients which it is desired to place in the can for intermixing with the peaches and pears.

While we have indicated the alternate delivery of pear and peach sections into the cans as desirable, this is not necessary as they can be delivered in any order found to be expedient.

Any form of carrier element such as a belt or other conveyor element may be substituted for the chain elements as disclosed herein.

While we have indicated the cutting knife as a stationary circular one, such knife may be of any desired form and may be stationary, revolving or moving as may be found most effective in practice.

From the foregoing description, it will be apparent that by means of the specific apparatus disclosed in this application, or by means of other equivalent apparatus, my improved method of preparing fruit sections and continuously and automatically filling them into the can can be carried out with dispatch and accuracy and uniformity as to proportions of fruit, all of which can be accomplished much faster and more expeditiously and inexpensively than by hand cutting and filling the cans with the fruits for salad. While I have shown one specific form of apparatus for carrying out the method, I of course do not wish to be understood as particularly limiting myself to that preferred specific form, but the invention, insofar as the method is concerned, contemplates broadly the use of any apparatus capable of being used to carry out the method.

Furthermore, although I have shown in some detail the specific apparatus contemplated by the invention, and which I believe to be new and novel, nevertheless I do not intend to be understood as limiting myself to the specific details thereof, but assert that the invention contemplates all deviations and modifications thereof which shall fall within the scope of the appended claims.

Having thus described my invention, what I claim to be new and novel and desire to secure by Letters Patent is:

1. That method of cutting and canning fruit sections comprising the steps of continuously moving a succession of independent streams of individual fruit pieces, maintaining the pieces in each stream in substantially equally spaced relation, independently cutting each piece into sections without interrupting the movement of the stream, moving a can past the several streams of fruit, and discharging only the sections of one piece of the fruit into the can as it passes each stream.

2. In a combination cutting and canning means for fruit sections, a succession of conveyors spaced substantially equally apart, each conveyor being provided with a plurality of fruit carriers equally spaced along the length of the conveyor, each carrier being adapted to receive a fruit half, a cutting means, means to drive the conveyor to successively carry the fruit halves into engagement with the cutting means to cut the fruit halves into sections, a can filling line comprising a conveyor, such conveyor being provided along its length with a plurality of equally spaced can carriers each adapted to receive a can, means to drive the can carrying conveyor, the latter conveyor being positioned at substantially right angles to and sufficiently below the succession of fruit carrying conveyors so that the tops of the cans carried by the can conveyor will be below the fruit carriers as they turn about the adjacent ends of the fruit carrier line whereby the cut fruit sections will then discharge into the cans, the relative speed of travel of the fruit carrier lines and the can line being such that a can will pass a fruit carrier line at the time a fruit carrier is moving around the end of its respective conveyor whereby the sections of one fruit half only will discharge into a can as it passes each fruit carrying line.

3. In a combination cutting and canning means for fruit sections, a succession of conveyors spaced substantially equally apart, each conveyor being provided with a plurality of fruit carriers equally spaced along the length of the conveyor, each carrier being adapted to receive a fruit half, a cutting means, means to drive the conveyor to successively carry the fruit halves into engagement with the cutting means to cut the fruit halves into sections, a can filling line comprising a conveyor, such conveyor being provided along its length with a plurality of equally spaced can carriers each adapted to receive a can, means to drive the can carrying conveyor, the latter conveyor being positioned at substantially right angles to and sufficiently below the succession of fruit carrying conveyors so that the tops of the cans carried by the can conveyor will be below the fruit carriers as they turn about the adjacent ends of the fruit carrier line whereby the cut fruit sections will then discharge into the cans, the relative speed of travel of the fruit carrier lines and the can line being such that a can will pass a fruit carrier line at the time a fruit carrier is moving around the end of its respective conveyor whereby the sections of one fruit half only will dischage into a can as it passes each fruit carrying line; each fruit carrier being a substantially flat disc to receive the flat portion of the fruit half, means on one side of the carrier to prevent the dislodgement of the fruit half as it is engaged with the cutting means, the opposite side of the disc being unobstructed whereby the cut fruit sections will readily slide off the same into the can as the disc turns around the end of the conveyor.

THOMAS ALTON.